United States Patent Office 3,121,120
PROCESS FOR THE PREPARATION OF ETHERIC CONDENSATION PRODUCTS
Amelio E. Montagna and Donald G. Kubler, South Charleston, W. Va., assignors to Union Carbide Corporation, a corporation of New York
No Drawing. Filed Sept. 17, 1957, Ser. No. 684,407
3 Claims. (Cl. 260—615)

This invention relates to certain etheric condensation products and a process for preparing the same. More particularly it relates to stable unsaturated acetals as condensation products of alpha,beta-unsaturated ethers and to a process for the controlled preparation thereof.

The monomeric ethers employed in the preparation of the condensation products of the present invention can be represented graphically as follows:

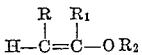

wherein each of R and $R_1$ is hydrogen, an alkyl radical containing desirably from 1 to 12 carbon atoms or an arylalkyl radical containing normally from 7 to 12 carbon atoms; and $R_2$ is an alkoxyalkyl radical containing from 3 to 9 carbon atoms, an aryloxyalkyl radical containing from 7 to 9 carbon atoms, an alkyl radical containing desirably from 1 to 12 carbon atoms or an arylalkyl radical containing usually from 7 to 12 carbon atoms. Each of R and $R_1$ is most desirably an alkyl radical containing from 1 to 4 carbon atoms. It will be noted however that the particular constituents constituting R, $R_1$ and $R_2$ are not narrrowly critical.

Heretofore it has been suggested to polymerize alpha,-beta-unsaturated ethers but such polymerizations have been so rapid and uncontrollable as to result in polymers of relatively high chain lengths and the stable dimers, trimers and tetramers as well as the pentamers, hexamers, heptomers and octamers of these ethers have therefore been unobtainable by this procedure.

The process of the present invention comprises therefore forming a mixture of at least two moles of one or more of these alpha,beta-unsaturated ethers described hereinabove, together with a mercuric salt of an organic acid and a Friedel-Crafts catalyst, or acid-activated hydrous natural clay to cause the readily controlled condensation of said monomer(s) to the corresponding dimer, trimer, tetramer and the like. Other higher molecular weight homopolymers and copolymers can also be formed by this process as desired.

The conversion of a monomeric vinyl ether to its dimer, trimer, tetramer, or higher polymeric product can be illustrated graphically as follows:

DIMERIZATION

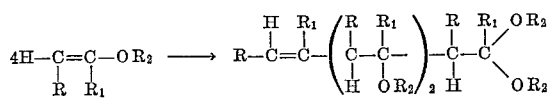

TRIMERIZATION

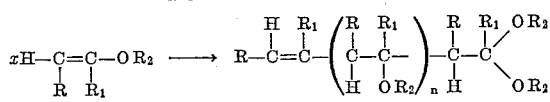

TETRAMERIZATION $$4H-C=C-OR_2 \longrightarrow R-C=C-\begin{pmatrix} R & R_1 \\ | & | \\ C-C- \\ | & | \\ H & OR_2 \end{pmatrix}_2 \begin{matrix} R & R_1 & OR_2 \\ | & | & / \\ -C-C \\ | & | & \backslash \\ H & & OR_2 \end{matrix}$$

POLYMERIZATION $$xH-C=C-OR_2 \longrightarrow R-C=C-\begin{pmatrix} R & R_1 \\ | & | \\ C-C- \\ | & | \\ H & OR_2 \end{pmatrix}_n \begin{matrix} R & R_1 & OR_2 \\ | & | & / \\ -C-C \\ | & | & \backslash \\ H & & OR_2 \end{matrix}$$

In the above formulas, R, $R_1$, and $R_2$ are as represented hereinabove, $x$ is an integer of 2 to 8 and $n$ is any number in the range of 0 to 6.

As noted above co-dimerizations, co-trimerizations, and co-tetramerizations of these alpha,beta-unsaturated ethers can also be performed. Illustrative of the three different types of co-condensation reactions which can occur and are within the purview of the present invention are the following (1) alkyl ethers in which the alkenyl radicals are the same but the alkyl radicals are different, i.e., vinyl ethyl ether and vinyl butyl ether; (2) those in which the alkenyl radicals are different and the alkyl radicals are the same, i.e. vinyl ethyl ether and 1-butenyl ethyl ether; and (3) those in which both the alkenyl and alkyl radicals are different, i.e. vinyl methyl ether and 1-butenyl ethyl ether.

By way of further illustration is the following graphic representation in which vinyl ethyl ether and 1-butenyl ethyl ether are condensed, together with the products obtained by this co-condensation reaction:

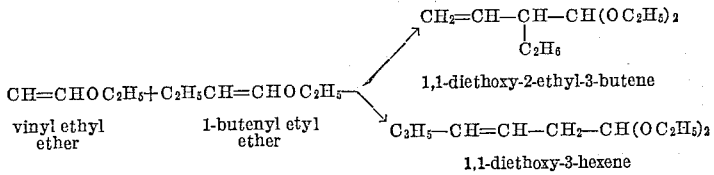

The corresponding dimers, trimers, tetramers and homo-polymers of the vinyl ethyl ether and 1-butenyl ethyl ether monomers can also be obtained in the course of the reaction.

Illustrative of the alpha,beta-ethylenically unsaturated ethers which serve as reactant monomers herein are the following: 2-isopropoxyethyl vinyl ether, 5-butoxy pentyl vinyl ether, 1-(2-phenoxy)ethoxy-2-benzyl ethylene, benzyl vinyl ether, vinyl methyl ether, vinyl propyl ether, vinyl isopropyl ethyl, vinyl butyl ether, vinyl isobutyl ether, vinyl amyl ether, vinyl hexyl ether, vinyl heptyl ether, vinyl octyl ether, vinyl nonyl ether, vinyl decyl ether, vinyl methoxyethyl ether, vinyl butoxyethyl ether, vinyl phenoxyethyl ether, vinyl benzyl ether, vinyl furfuryl ether, 1-propenyl methyl ether, 1-propenyl butyl ether, 1-hexenyl methyl ether, 1-hexenyl butyl ether, isopropenyl methyl ether, isopropenyl butyl ether.

Examples of the dimers as prepared herein are:

1,1-dimethoxy-3-butene,
1,1-diethoxy-3-butene,
1,1-di(2,2-diorthochlorophenoxy)butoxy-3-butene,
1,1-di(2,2-diorthonitrophenoxy)butoxy-3-butene,
1,1-di(2,2-diphenyl)butoxy-3-pentene,
1,1-dibutoxy-3-butene,
1,1-di-(2-ethylhexoxy)-3-butene,
1,1-didecoxy-3-butene,
1,1-di-(2-methoxyethoxy)-3-butene,
1,1-di-(2-phenoxyethoxy)-3-butene,
1,1-dibenzoxy-3-butene,
1,1-dimethoxy-2-methyl-3-pentene,
1,1-diethoxy-2-ethyl-3-hexene,
1,1-dibutoxy-2-butyl-3-octene,
4,4-dimethoxy-2-methyl-1-pentene,
4,4-diethoxy-2-methyl-1-pentene, and 4,4-dibutoxy-2-methyl-1-pentene.

Illustrative of the trimers prepared by the process of the present invention are the following:
1,1,3-trimethoxy-5-hexene,
1,1,3-triethoxy-5-hexene,
1,1,3-tri(2-ethylhexoxy)-5-hexene,
1,1,3-tridecoxy-5-hexene,
1,1,3-tri-(2-methoxyethoxy)-5-hexene,
1,1,3-tri-(2-phenoxyethoxy)-5-hexene and
1,1,3-tribenzoxy-5-hexene;
1,1,3-trimethoxy-2,4-dimethyl-5-heptene and
1,1,3-triethoxy-2,4-dimethyl-5-heptene;
1,1,3-trimethoxy-2,4-diethyl-5-octene and
1,1,3-triethoxy-2,4-diethyl-5-octene;
4,6,6-trimethoxy-2,4-dimethyl-1-heptene and
4,6,6-triethoxy-2,4-dimethyl-1-heptene.

Examples of the tetramers prepared by our process as described herein are the following:
1,1,3,5-tetramethoxy-7-octene,
1,1,3,5-tetraethoxy-7-octene,
1,1,3,5-tetra(2-ethylhexoxy)-7-octene,
1,1,3,5-tetradecoxy-7-octene,
1,1,3,5-tetra(2-methoxyethoxy)-7-octene,
1,1,3,5-tetra-(2-phenoxyethoxy)-7-octene and
1,1,3,5-tetrabenzoxy-7-octene;
1,1,3,5-tetramethoxy-2,4,6-trimethyl-7-nonene and
1,1,3,5-tetraethoxy-2,4,6-trimethyl-7-nonene;
1,1,3,5-tetramethoxy-2,4,6-triethyl-7-decene and
1,1,3,5-tetraethoxy-2,4,6-triethyl-7-decene;
4,6,8,8-tetramethoxy-2,4,6-trimethyl-1-nonene and
4,6,8,8-tetraethoxy-2,4,6-trimethyl-1-nonene.

The term "metallic halide Friedel-Crafts catalyst" as employed throughout this specification is intended to encompass the following compounds: zinc chloride, ferric chloride, ferric bromide, titanium tetrachloride, titanium trichloride, cupric bromide, boron trifluoride, boron trichloride, gallium trichloride, stannic chloride, stannic bromide, bismuth trichloride, bismuth tribromide, antimony chloride, aluminum chloride and aluminum bromide.

The second class of catalysts which are employed in the practice of the present invention are acid-activated substantially dry hydrous clays which are best characterized as natural clay minerals having essentially a hydrous aluminum silicate structure, with or without the isomorphous substitution of other atoms, such as those of sodium, potassium, calcium, magnesium or iron, for part of the aluminum and silicon ions of the crystal lattice (as shown by chemical analysis, electron diffraction, and a study of the ion-exchange properties). These materials are activated by a mineral acid treatment such as dilute sulfuric acid or hydrochloric acid, e.g., a 10 percent aqueous solution of sulfuric or hydrochloric acid, with subsequent removal of excess acid with water under conditions commonly used in producing acid-activated natural clays.

Among suitable heterogeneous catalysts useful in the process are fuller5s earth of the halloysitic, montmorillonitic and attapulgitic classifications, including among others, the montmorillonite, beidellite, montronite, kaolinite, nacrite, dickite and metahalloysite types. The several different hydrous aluminum silicate structures when acid-washed are effective catalysts though with different degrees of reactivity. Chemically pure acid-washed hydrous aluminum silicate, $Al_2O_3 \cdot 2SiO_2 \cdot 2H_2O$, is also an active catalyst.

All clays contain water, part of which is adsorbed and part of which is actually involved in the crystal lattice. It is preferred to remove substantially all of the adsorbed or physically bound water since otherwise it lowers the catalytic efficiency of the clay. This adsorbed water preferably is removed from the clay by roasting the latter at approximately 200° C. or by azeotropic distillation with xylene or other inert volatile liquid forming heterogeneous constant boiling mixtures with water. The chemically bound water of the hydrous aluminum silicates must be retained since otherwise a rupture of the lattice structure occurs with a loss of catalytic activity. Thus the catalysts of this invention further differ from highly purified alumina-silica catalysts in generally containing substantial amounts of alkali metals not adversely affecting their efficacy. Calcination at 950° C.–1400° C. for several hours as commonly used in the preparation of pure alumina-silica catalysts, greatly decreases the activity of the catalysts of this invention.

By the activation of the natural or raw clays or hydrous aluminum silicates with a dilute mineral acid it is believed that part or all of the more loosely bound cations on the surface of the crystal lattice are replaced by hydrogen ions, without changing the basic lattice structure.

The acidic catalyst, i.e. metallic halide or acid-activated clay, is used in amounts varying from about 0.01 to 5.0 percent by weight of alpha,beta-unsaturated ether constituent, with a preferred ratio in the range of about 0.02 percent of 0.5 percent by weight.

These acidic catalysts are used in combination with a mercuric salt of an organic acid or mole equivalents of mercuric oxide and an organic acid which will react in situ to form the corresponding salt. The mercuric salts employed are preferably mercuric salts of monobasic organic acids i.e. saturated and unsaturated aliphatic acids (and most desirably those containing 2 to 18 carbon atoms), aromatic acids (containing preferably 6 to 12 carbon atoms) and saturated and unsaturated cycloaliphatic acids (containing most desirably 3 to 18 carbon atoms) as well as the halogen and monovalent hydrocarbon substituted derivatives (preferably in the range of 1 to 2 and wherein the monovalent hydrocarbon contains from 1 to 6 carbon atoms) thereof. Representative of these compounds are the following: mercuric formate, mercuric acetate, mercuric ortho-chlorobenzoate, mercuric ortho-methyl benzoate, mercuric propionate, mercuric meta-methyl benzoate, mercuric oleate, mercuric para-chlorobenzoate, mercuric crotonate, mercuric butyrate, mercuric cyclohexanecarboxylate, mercuric benzoate, mercuric stearate and mercuric cyclohexenecarboxylate.

The mercuric salt or its mercuric oxide and organic acid equivalent, is used in amounts varying from 0.5 to 10.0 percent based on the weight of alpha,beta-unsaturated ether monomer(s) with a preferred range extending from about 1.0 percent to approximately 5.0 percent.

The most desirable catalyst system for effecting a maximum of efficiency and control is a combination of boron trifluoride with mercuric acetate or mercuric formate. These particular mercuric salts are preferred as co-catalysts because of their low molecular weights.

The function of these mixtures of acid-activated clay or metallic halide with a mercuric salt of an organic acid being that of a catalyst or initiator, any catalytic amount can be used.

A variety of inert, organic solvents can optionally be employed as diluents in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. The presence of a solvent is most desirable, although not essential to control the reaction where a batch process is employed and the monomer is introduced slowly to the reaction mix. The amount of solvent present can vary within wide limits, and while amounts up to about ten percent by volume of the total charge of alpha,beta-unsaturated ether reactant(s) are usually preferred, amounts in excess of this can be employed. Thus, this limit is one rather, of economic practicability. It is noted that the amount of diluent employed will also vary with the particular catalyst used (i.e., acid-activated clays are generally less diluted with solvent than the metallic halides); the particular alpha,beta-unsaturated ether monomer(s); and the manner in which the process is conducted (i.e., a continuous process would employ less solvent generally than a batch procedure as noted above).

The process is readily conducted in a continuous manner by passing a catalyst stream and an alpha,beta-unsaturated ether stream through a heat removal zone. The heat-removal zone may be a standard tube reactor maintained at a temperature such as to provide the proper reaction temperature while removing the heat of reaction.

The operative temperature range for obtaining a satisfactory yield of desired product is from 0° C. to 100° C. with the preferred range being from approximately 20° C. to 80° C.

Reaction times of from 15 minutes to 180 minutes are thoroughly practicable. Shorter or longer periods can also be feasibly employed depending upon the temperature (higher temperatures usually permit the use of shorter reaction times), the alpha,beta-unsaturated ether used (e.g., vinyl alkyl ethers are generally heated for shorter periods than the higher 1-alkenyl alkyl ethers), and the manner in which the process is conducted (i.e., batchwise or continuous process).

Pressure is in no wise critical and the reactions will proceed satisfactorily at atmospheric, subatmospheric, or superatmospheric pressures.

The acetals prepared by the process of the present invention are particularly useful when hydrogenated to the corresponding saturated derivatives as froth flotation agents for the concentration of minerals, e.g., copper, zinc, gold as well as for the separation of coking and non-coking coal. Conventional hydrogenation procedures are employed using Raney nickel catalyst at a temperature in the range of 50° C. to 150° C. under a pressure of 500 pounds per square inch gauge (p.s.i.g.) to 3000 p.s.i.g.

The following examples are further illustrative of the invention.

*Example I*

Into a two-liter, three-necked Pyrex glass reaction flask equipped with a thermometer, a stirrer, an addition funnel, and a reflux condenser, were placed 32 grams (0.1 mol) of mercuric acetate and 22 grams (0.1 mol) of 32 percent boron trifluoride in diethyl ether. (The term "percent" as employed throughout this specification refers to percent by weight unless otherwise explicitly indicated.) To this mixed catalyst solution was then added 100 ml. of diethyl ether to serve as a diluent. The flask and contents were maintained at 40° C. by means of an ice-water bath, while, a total of 720 grams (10 mols) of vinyl ethyl ether was added to the constantly stirred mixture during a period of 19 minutes. After all of the vinyl ethyl ether had been added, stirring was continued for an additional five minutes. The reaction mixture was then neutralized with 50 grams of sodium carbonate in 400 ml. of water. The contents of the flask were filtered, the water layer was removed, and the organic layer was distilled to remove the diethyl ether and the unreacted vinyl ethyl ether. By fractional distillation there was isolated from the residual material 367 grams (51 percent) of the dimer, 1,1-diethoxy-3-butene; 103 grams (14 percent) of the trimer, 1,1,3-triethoxy-5-hexene; and 57 grams (8 percent) of the tetramer, 1,1,3,5-tetraethoxy-7-octene, having the characteristics listed in the following table:

distillate (213 grams), by chemical analyses, contained 41.8 percent ethanol, 30.4 percent crotonaldehyde, and the balance was water. Redistillation of 191 grams of this distillate yielded 103 grams of the ternary azeotrope of ethanol, water, and crotonaldehyde, boiling from 77° to 79° C.; and 55 grams of the binary azeotrope of crotonaldehyde and water, boiling from 79° to 84° C.

To identify further the dimeric product believed to be 1,1-diethoxy-3-butene, a 2,4-dinitrophenylhydrazone was derived from the binary azeotrope thought to be crotonaldehyde and water. The melting point of this derivative was 190–3° C. The melting point of this 2,4-dinitrophenylhydrazone was not depressed when mixed with the 2,4-dinitrophenylhydrazone of a known sample of crotonaldehyde.

Hydrolysis of 1 ml. 1,1-diethoxy-3-butene was effected in a mixture of 250 ml. of ethanol, 100 ml. of water, 1 ml. of acetic acid and 0.8 gram of 2,4-dinitrophenylhydrazine. This mixture was allowed to stand 14 hours at room temperature and then was treated with 1 drop of concentrated phosphoric acid and 100 ml. of water. The 2,4-dinitrophenylhydrazone crystallized as golden plates which melted at 126–128° C. This material is the 2,4-dinitrophenylhydrazone of vinyl acetaldehyde.

A mixture of 1440 grams (10 moles) of 1,1-diethoxy-3-butene and 43 grams of Raney nickel was hydrogenated in a stirred autoclave. The nickel was filtered from the product and the product was distilled under reduced pressure to yield 1140 grams (78%) of diethylbutyral (1,1-diethoxybutane), B.P. 68°/50 mm., 146°/760 mm., $n_D^{20}$ 1.3959, sp. gr. 20/20, 0.8297. The values for a control sample of diethylbutyral were B.P. 146°/760 mm., $n_D^{20}$ 1.3958, sp. gr. 20/20, 0.8295. In addition, the infrared spectra for the two samples were identical over the region of 2 to 15 microns.

The above data along with the infrared and mass spectra for vinyl ethyl ether dimer (showing terminal unsaturation and the presence of an acetal group) confirmed the structure as 1,1-diethoxy-3-butene.

To identify the trimer, 216 grams of material thought to be 1,1,3-triethoxy-5-hexene and 100 grams of acetic acid were mixed with 100 ml. of water and 2 ml. of concentrated sulfuric acid. The mixture was then heated in a still kettle until reflux temperature was attained and was maintained at reflux temperature for 20 minutes. The mixture was then slowly distilled until the vapor temperature could no longer be maintained below 80° C. At this temperature the distillate became heterogeneous and the distillation was stopped so that the sulfuric acid could be neutralized with 3 grams of sodium hydroxide in 500 ml. of water. The organic products were steam-distilled to give a total of 74 grams of yellow upper organic layer. Upon distillation the organic layer yielded 53 grams of 2,4-hexadienal, B.P.=53 to 57° C./10 mm., sp. gr. 20/15.6=0.896 which compare with the literature values for 2,4-hexadienal of B.P.=57° C./10 mm.; sp. gr. 20/20=0.8994.

*Example II*

Vinyl ethyl ether (720 grams, 10 mols) was added to a mixture of 7.2 grams of a dry commercially available,

| Compound | Boiling Point, ° C. | Refractive Index $n_D^{20}$ | Sp. Gr. at 20/15.6 | Percent C | | Percent H | |
|---|---|---|---|---|---|---|---|
| | | | | Calcd. | Found | Calcd. | Found |
| 1,1-Diethoxy-3-butene | 66–67°/50 mm | 1.4087 | 0.850 | 66.67 | 66.27 | 11.12 | 11.23 |
| 1,1,3-Triethoxy-5-hexene | 94–96°/10 mm | 1.4247 | 0.892 | 66.67 | 66.40 | 11.12 | 11.11 |
| 1,1,3,5-Tetraethoxy-7-octene | 137–140°/10 mm | 1.4324 | 0.9135 | 66.67 | 66.41 | 11.12 | 11.09 |

As a means of identification, 144 grams (1 mol) of the dimeric product, 1,1-diethoxy-3-butene was treated with 100 ml. of 1 percent sulfuric acid solution and the resultant heterogeneous mixture was slowly distilled until the only component of the distillate was water. The mineral acid-activated clay and 47.5 grams (0.15 mole) of mercuric acetate at 40° C. as in Example I. There was isolated 240 grams (33 percent) of 1,1-diethoxy-3-butene and 96 grams (13 percent) of 1,1,3-triethoxy-5-hexene.

Example III

In a manner similar to that above, 720 grams (10 mols) of vinyl ethyl ether was reacted in the presence of 13.5 grams (0.1 mole) of zinc chloride, 47.5 grams (0.15 mole) of mercuric acetate, and 100 ml. of diethyl ether. The reaction mixture yielded 63 grams (9 percent) of 1,1-diethoxy-3-butene and 91 grams (12.5 percent) of 1,1,3-triethoxy-5-hexene.

Example IV

Vinyl ethyl ether (720 grams, 10 moles) was added to a mixture of 6.7 grams (0.05 mol) of aluminum chloride, 32 grams (0.1 mol) of mercuric acetate and 100 ml. of diethyl ether over a period of 18 minutes while maintaining a reaction temperature of 40° C. The reaction mixture was permitted to stand an additional five minutes prior to neutralization and filtration. The organic material was distilled to provide 79 grams (11 percent yield) of 1,1-diethoxy-3-butene and 145 grams (20 percent yield) of 1,1,3-triethoxy-5-hexene.

Example V

Vinyl 2-ethylhexyl ether (822 grams, 5.27 mols) was condensed by means of 11.1 grams of 32 percent boron trifluoride (0.053 mole) in diethyl ether and 16.3 grams (0.051 mole) of mercuric acetate in 60 ml. of diethyl ether at 40° C. Isolation of the products afforded 574 grams (70 percent) of 1,1-di-(2-ethylhexoxy)-3-butene; B.P.=120–128°/1.5 mm., $n_D^{20}$=1.4422, sp. gr. 20/15.6=0.852. The trimer, 1,1,3-tri-(2-ethylhexoxy)-5-hexene distilled at 180–187°/1.5 mm. (84 grams, 10 percent) and had a refractive index at 20° C. of 1.4484, sp. gr. 20/15.6 of 0.867, calcd. M.R. (molecular refraction) =144.72 and obs. M.R.=144.86.

The dimer was identified on the basis of the following evidence. Calcd. for $C_{20}H_{40}O_2$: C, 76.86; H, 12.90; M.R., 97.38. Found: C, 76.64; H, 13.09; M.R., 97.05. A sample (3.2 grams) of the dimer was mixed with 4.0 grams of acetic acid, 2 ml. of water, and 2 drops of 50 percent sulfuric acid. This solution was gently refluxed for one hour and the 2,4-dinitrophenylhydrazone was made. This derivative melted at 188–190° (lit. M.P. =190° for crotonaldehyde) and the melting point was not depressed when in admixture with a control sample of crotonaldehyde-2,4-dinitrophenylhydrazone.

Example VI

A mixture of 8.4 grams of 32 percent boron trifluoride in diethyl ether, 19 grams (0.06 mole) of mercuric acetate and 40 ml. of diethyl ether was made. To this mixture, as in Example I, there was added 400 grams (4.0 moles) of 1-butenyl ethyl ether during a 5-minute period while maintaining the temperature at about 40° C. Slight cooling was required over the next 50 minutes to maintain the temperature at 40° C. The catalyst was neutralized and the mixture was processed as in Example I. The dimer of 1-butenyl ethyl ether, 1,1-diethoxy-2-ethyl-3-hexene was obtained in 29.8 percent yield, B.P.=82–90°/10 mm., $n_D^{20}$=1.4265, sp. gr. 20/15.6=0.857. Calcd. for $C_{12}H_{24}O_2$: C, 71.95; H, 12.08; M. R., 60.43. Found: C, 71.42; H, 11.94; M.R. 60.61.

A 2.0 gram sample of this dimer was treated in the same manner as for 1,1-di(2-ethylhexoxy)-3-butene to form a 2,4-dinitrophenylhydrazone. This derivative melted at 124–125° C. An authentic sample of the 2,4-dinitrophenylhydrazone of 2-ethyl-2-hexenal melted at 124–125° and a mixture of these materials melted at 124–126°, thus confirming the identity of the hydrolysis product.

Example VII

Utilizing the same method as in Example I, 430 grams (5.0 moles) of isopropenyl ethyl ether was added to a mixture of 10.5 grams of 32 percent boron trifluoride in diethyl ether, 23.8 grams of mercuric acetate and 50 ml. of diethyl ether. A reaction time of 2 hours and 30 minutes was used at 35–37° C. The dimeric product, 4,4-diethoxy-2-methyl-1-pentene was obtained in 11 percent yield and had the following physical properties: B.P.=67–68/20 mm., $n_D^{20}$=1.4241, sp. gr. 20/15.6=0.863. Calcd. for $C_{10}H_{20}O_2$: C, 69.72; H, 11.70; M.R. 51.2. Found: C, 69.37; H, 11.72; M.R. 50.9.

Two grams of this product was mixed with 2 grams of acetic acid, 2 grams of water and 2 drops of 50 percent sulfuric acid and the resulting homogeneous solution was gently refluxed for 10 minutes. The hydrolyzed product was directly converted to its 2,4-dinitrophenylhydrazone for identification. The bright red solid after being recrystallized from an ethyl acetate-ethanol mixture melted at 199–201° C. The 2,4-dinitrophenylhydrazone of a control sample of mesityl oxide melted at 197–199° C. and a mixture of the two derivatives melted at 197–201° C.

What is claimed is:

1. A process for preparing vinyl acetals of the formula:

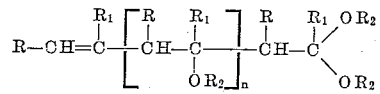

wherein R and $R_1$ are selected from the group consisting of hydrogen and lower alkyl; $R_2$ is lower alkyl; and $n$ is an integer of from 1 to 6; which comprises forming a mixture of: (1) a catalyst consisting essentially of (a) a mercuric salt of an organic carboxylic acid and (b) acid-activated substantially dry hydrous clay, and (2) a vinyl ether of the formula:

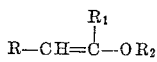

wherein R, and $R_2$ are as indicated above, at a temperature in the range of 0° C. to 100° C.

2. A process for preparying vinyl acetals of the formula:

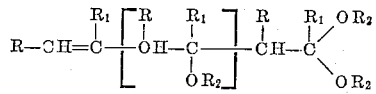

wherein R and $R_1$ are selected from the group consisting of hydrogen and lower alkyl; $R_2$ is lower alkyl; and $n$ is an integer of from 1 to 6; which comprises forming a mixture of: (1) a catalyst consisting essentially of (a) mercuric acetate and (b) acid-activated substantially dry hydrous clay, and (2) a vinyl ether of the formula:

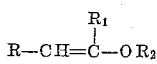

wherein R, $R_1$, and $R_2$ are as indicated above, at a temperature in the range of 0° C. to 100° C.

3. A process for preparing 1,1,3-triethoxy-5-hexene which comprises forming a mixture of (1) a catalyst consisting essentially of (a) mercuric acetate and (b) acid-activated substantially dry hydrous clay and (2) vinyl ethyl ether at a temperature in the range of 0° C. to 100° C.

References Cited in the file of this patent

UNITED STATES PATENTS

| | | |
|---|---|---|
| 2,192,015 | Nieuwland et al. | Feb. 27, 1940 |
| 2,573,678 | Saunders | Nov. 6, 1951 |

FOREIGN PATENTS

| | | |
|---|---|---|
| 378,544 | Great Britain | Aug. 18, 1932 |

OTHER REFERENCES

Thomas: Anhydrous Aluminum Chloride in Organic Chemistry (1941), pp. 874–878.